United States Patent
Buckner et al.

(10) Patent No.: US 8,033,299 B2
(45) Date of Patent: *Oct. 11, 2011

(54) UTILITY VALVE ACCESS AND PERFORMANCE EVALUTATION METHOD

(76) Inventors: Lynn A. Buckner, Flintstone, GA (US);
Don M. Buckner, Leesburg, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 12/584,441

(22) Filed: Sep. 4, 2009

(65) Prior Publication Data

US 2010/0024153 A1   Feb. 4, 2010

Related U.S. Application Data

(63) Continuation of application No. 10/683,674, filed on Oct. 14, 2003, now Pat. No. 7,604,023.

(51) Int. Cl.
A01G 25/09   (2006.01)

(52) U.S. Cl. .................................. 137/899.4

(58) Field of Classification Search .............. 137/899.4, 137/355.12, 272, 899; 73/168
See application file for complete search history.

(56) References Cited

U.S. PATENT DOCUMENTS

| | | | | |
|---|---|---|---|---|
| 4,561,459 A | * | 12/1985 | Jackman | 137/291 |
| 6,125,868 A | * | 10/2000 | Murphy et al. | 137/1 |
| 6,850,843 B2 | * | 2/2005 | Smith et al. | 701/213 |
| 7,334,606 B1 | * | 2/2008 | Hurley | 137/899 |
| 7,604,023 B2 | * | 10/2009 | Buckner et al. | 137/899.4 |
| 7,607,624 B1 | * | 10/2009 | Hurley | 248/278.1 |
| 7,703,473 B1 | * | 4/2010 | Hurley | 137/343 |

* cited by examiner

Primary Examiner — Craig M Schneider

(57) ABSTRACT

A vacuum container having a vacuum producing means, mounted on a vehicle, a trailer, or skid mounted, with options chosen from an articulating boom, a water jetter system, a liquid pressure dissipating means, a valve actuator, and a drive motor for the valve actuator being either hydraulic, air, or electric powered, a global positioning system to determine and log the position of work, service or hardware, controls and measuring devices and de-chlorinator.

22 Claims, 6 Drawing Sheets

UTILITY VALVE ACCESS AND PERFORMANCE EVALUTATION METHOD

This application is A Continuation of application Ser. No. 10/683,674 and claims the benefits of the parent application Ser. No. 10/683,674 filed 14 Oct. 2003 now U.S. Pat. No. 7,604,023

BACKGROUND OF THE INVENTION

Utility valves have historically been buried either on purpose or by silt from storms. Access to the valve was accomplished mechanically by a shovel and hand digging. A hand wrench or hand tool is used to open or close the valve. In the case of fire hydrants the valve was opened by hand, a fire hose attached and the water flow through the hose was released under pressure on the highway or yard, eroding and doing damage to an expensive fire truck that was driven to the hydrant to receive the water.

The present invention uses hydro vacuum excavation to access buried valves, a power head to actuate the valve and in the case of hydrants, a liquid pressure dissipater consisting of a plurality of baffles releases the discharged water with minimum pressure like rain onto the ground thus reducing erosion. A GPS documents physical location and measuring means document maintenance condition of the valve and characteristics of the utility. Controllers manage the interaction of the various functions of the invention. The system is mounted on a transportable means.

SUMMARY OF THE INVENTION

The present invention relates to using a vacuum container having a vacuum producing means and vacuum hose to vacuum debris from around valves so that the valve stem or valve handle may be accessed in order to actuate the valve.

A pressure washer or water jetter may also accompany the vacuum system in order to dislodge and make vacuum able the debris around a valve or in a valve box. A power head such as a hydraulic motor, D.C. motor, air motor or air cylinder may be used to actuate a valve. A power boom arm may be used to locate the power head into position. Extensions may be used between the power head and the valve stem especially when a valve is located below ground level. Control means operate the forward and reverse rotation of the valve stem as well as power head positioning onto the valve stem. Metering and monitoring means document the opening, closing, and torque required to operate the valve, as well as utility flow volumes and characteristics. When large volumes of water are released under pressure such as in the testing of fire hydrants, a pressure dissipating means may be used to avoid water damage to the surrounding area without obstructing the flow from test valves.

The above-mentioned means function as a unit to accomplish a common objective, which is to access, actuate, and document location, flow rates, pressure, utility characteristics, and condition of utility valves.

The above-mentioned objectives are accomplished by the present invention by constructing a transportable unit consisting of a vacuum container system, a water pressure cleaning and jettering system, a power supply, a power head to actuate the valves, a pressure dissipating means and a hose to connect the valve to the pressure dissipating means along with a GPS locator system, performance documenting means and controls to operate the interaction of the above mentioned system. A de-chlorinator may be added so as to decontaminate water before it is released into a storm drain or onto the ground.

DESCRIPTION OF THE PREFERRED IMBODIMENT

Figure 1:
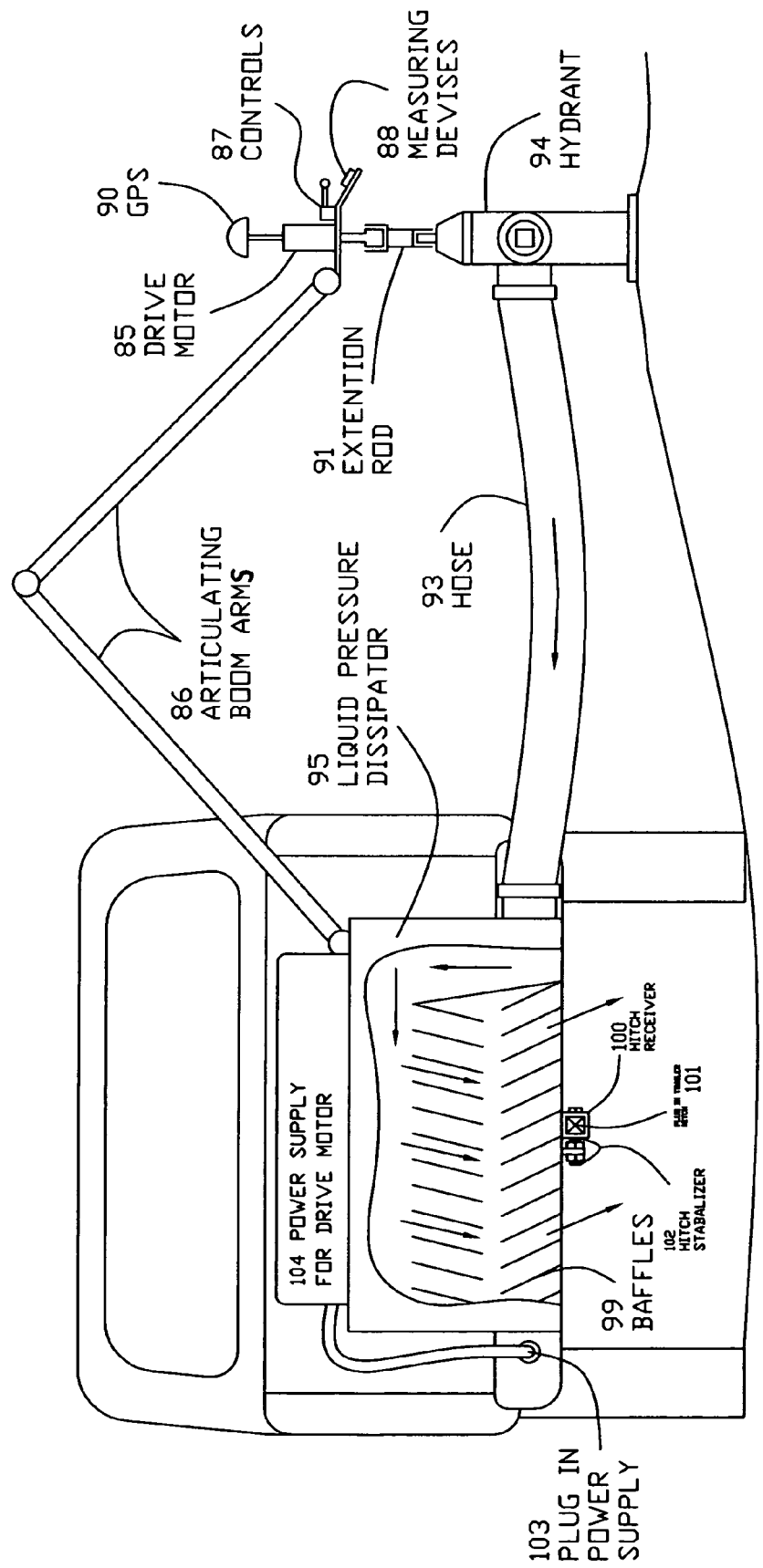
FIG. 1 is an end view of a truck with a liquid pressure dissipater 95 mounted on a hitch 101 plugged into a receiver coupler 100 at the back bumper of a vehicle. A hitch stabilizer 102 secures the unit. A fire hose 93 attaches the liquid pressure dissipater 95 to a fire hydrant 94, which has been opened by a power head 85, which is supported by an articulating boom arm 86, which is mounted to the liquid pressure dissipater 95. A hydraulic power supply 104 powers the hydraulic drive motor 85. The hydraulic power supply 104 is battery operated and the battery is charged by the truck electrical system by way of the electrical plug in 103. A GPS 90 locates the physical position of the water hydrant. The baffles 99 in the liquid pressure dissipater 95 allow the water 97 to fall to the ground like rain. Controls 87 operate the drive motor 85 and measuring devices 88 record the torque & revolutions to open or close the valve.
Figure 2:
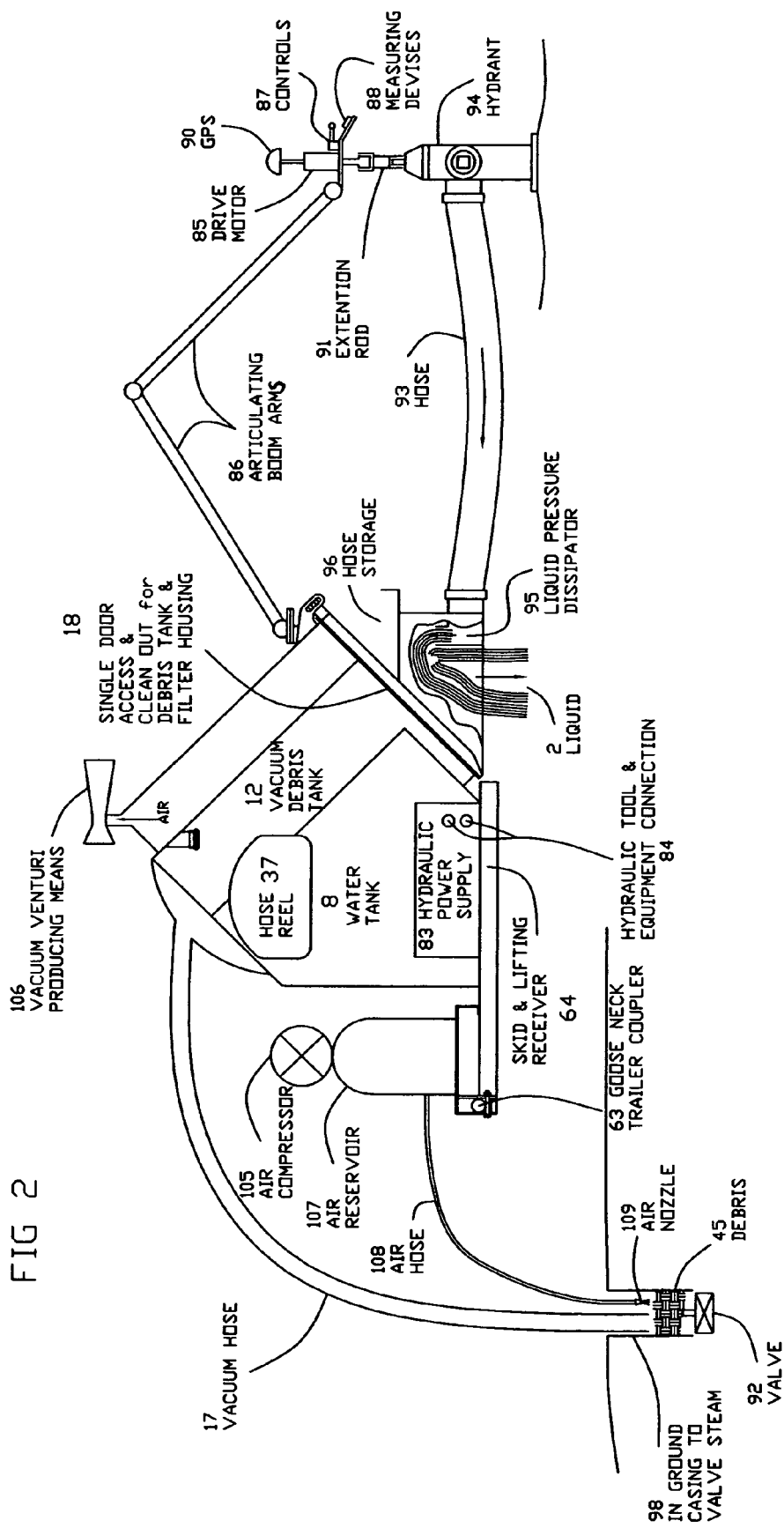
FIG. 2 is a side view of a vacuum debris tank 12 having a filter housing 62 a hose reel 37 and a single rear door 18 access to the debris tank 12. A power plant 67 consists of a diesel or gas engine to power an air compressor 105, or 12-VDC generator for charging batteries and powering the control systems. A hydraulic power supply 83 may be direct engine driven, belt driven or 12-VDC battery powered. The hydraulic power supply 83 may have connections 84 to power tools and portable equipment. The hydraulic power supply 83 may also power the drive motor 85. The articulated boom arm 86 may also be hydraulically manipulated. A liquid pressure dissipater 95 is shown mounted to the rear door 18 and liquid 2 is shown dropping to the ground. A hose storage area 96 is shown over the pressure dissipater 95. An articulated boom arm 86, which holds the valve actuator motor 85, is shown attached to the vacuum container filter housing 62. This boom arm 86 may also be used to support a vacuum hose. The boom may be powered by air pressure or hydraulic or linear actuator. An air reservoir 107, air hose 108 and air nozzle 109 are shown loosening debris 45 from a valve box 98. Vacuum hose 17 is shown vacuuming the debris 45 in to a vacuum tank 12. The vacuum producing means in this case is shown to be a compressed air venturi vacuum source 106. The above system is skid mounted 64 so it can be mobilized by a skid steer, forklift, truck bed or other mobile vehicle.
Figure 3:
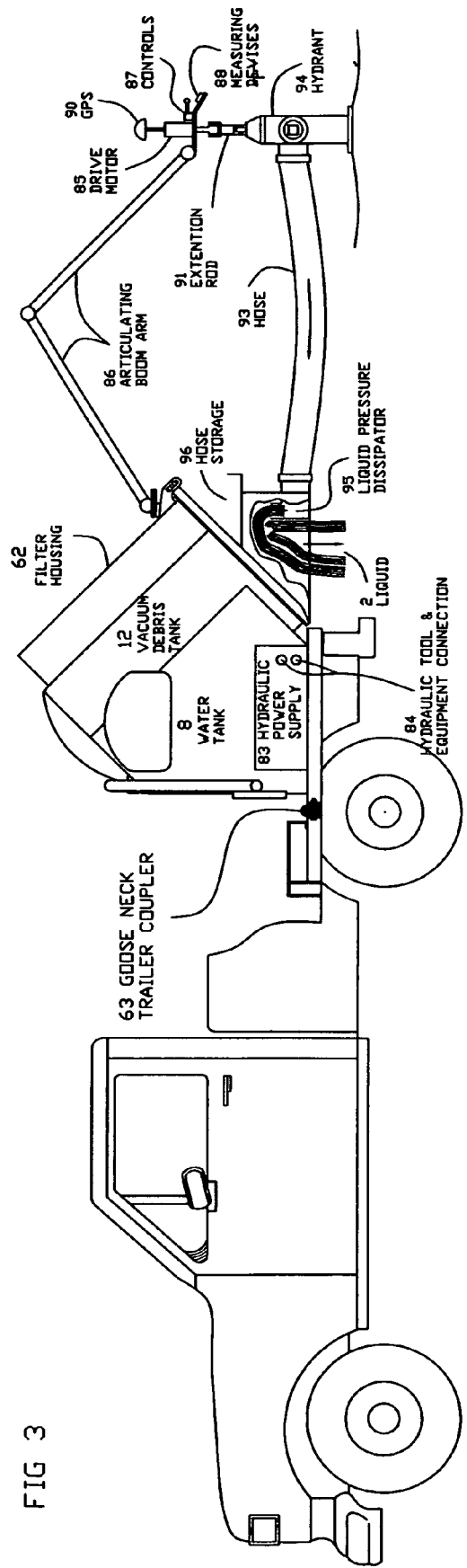
FIG. 3 is similar to FIG. 2 with the exception that the system is shown mounted on a truck bed secured by a gooseneck trailer coupler 63.
Figure 4:
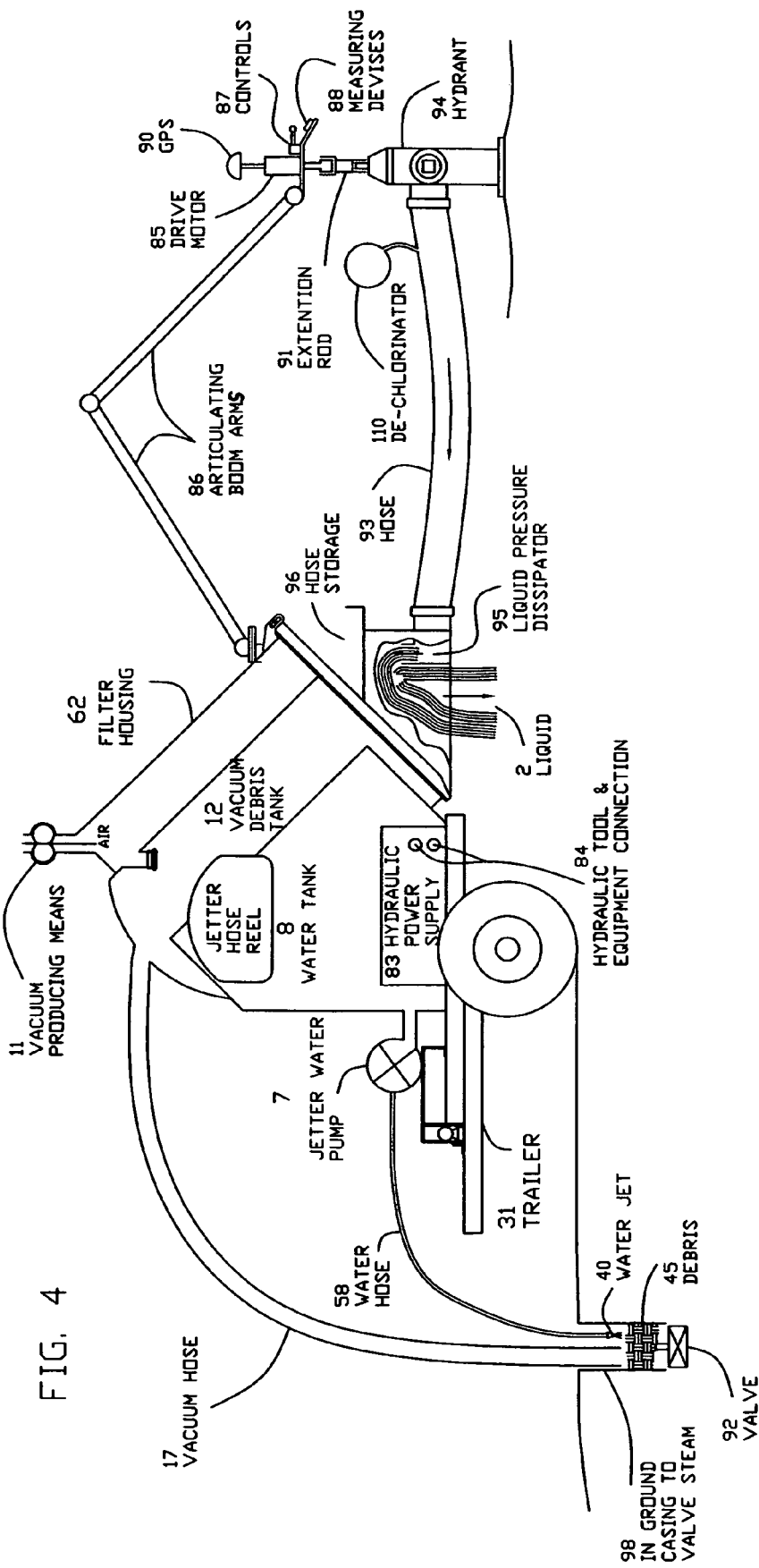
FIG. 4 is similar to FIG. 2 with the exception that the system is mounted on a trailer and vacuum hose 17 is shown vacuuming debris 45, which has been loosened by a water jetter, which consists of a water jet 40, a water hose 58, a jetter water pump 7, a water storage tank 8, and a hose reel 37. The above vacuum and jetter system cleans debris 45 from an in-ground casing 98 or valve box, which allows access to the buried valve 92 stem. A de-chlorinator 110 is also shown.
Figure 5:
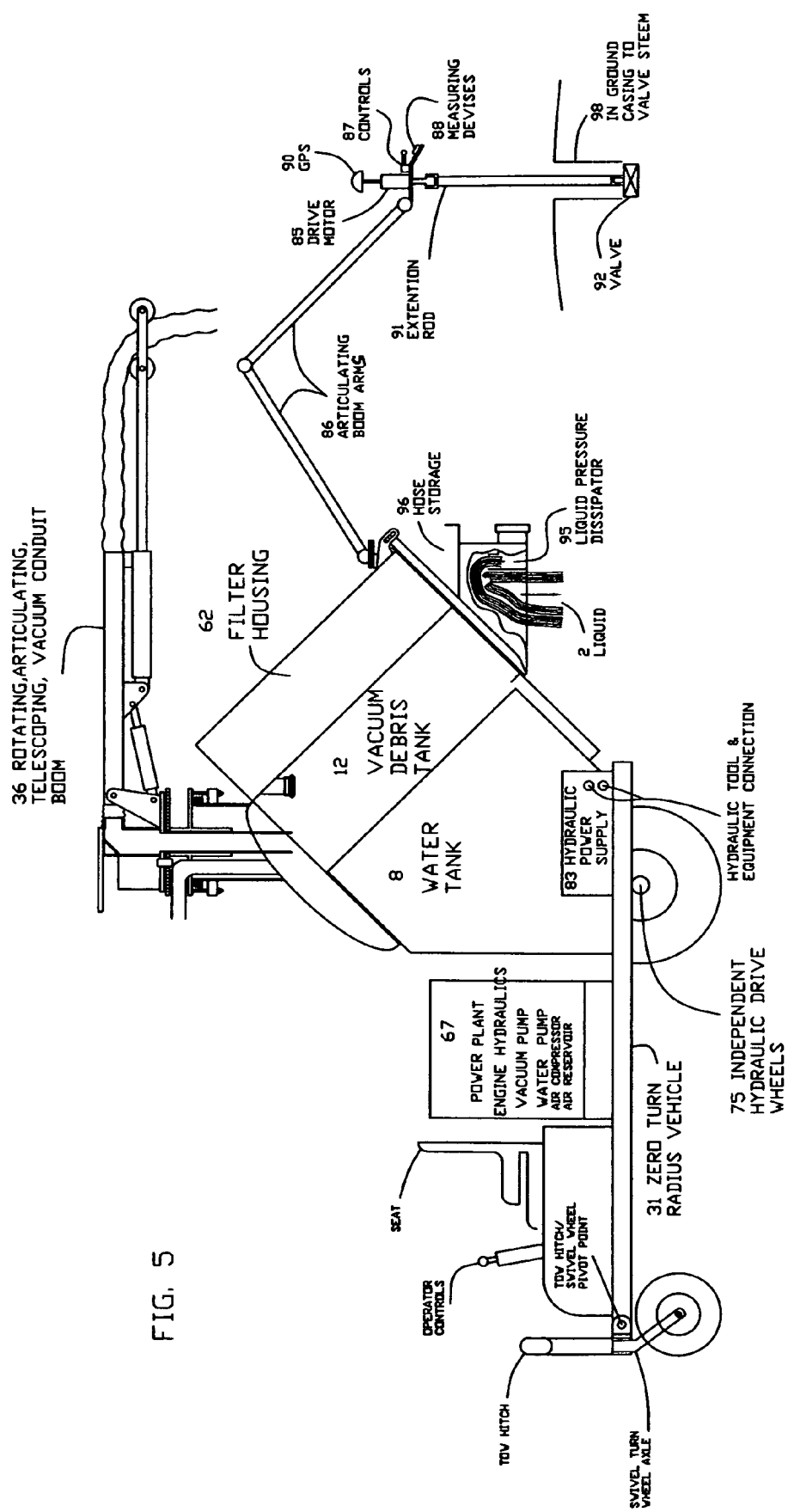
FIG. 5 is similar to FIG. 2 with the exception that the system is shown mounted on a zero turn radius vehicle 31 having a powered vacuum boom 36. The power head 85 articulating boom 86, which may also be powered or manual with spring balancing is shown actuating a buried valve 92 by means of an extension rod 91.
Figure 6:
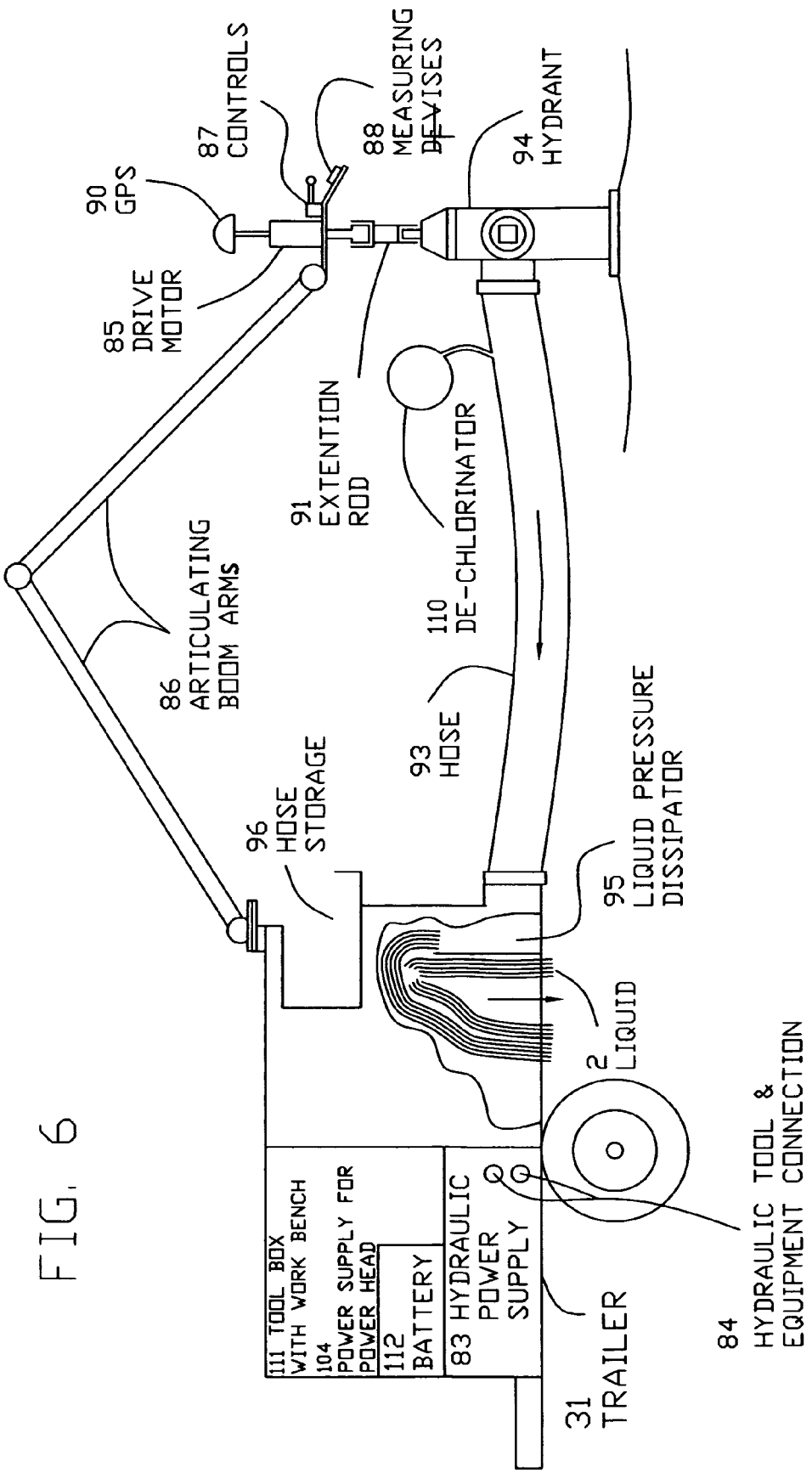
FIG. 6 is similar to FIG. 1 with the addition of a Trailer 31, a Hydraulic power supply 83 for operating hydraulic tools 84; a de-chlorinator 110 is also shown. The de-chlorinator removes chlorine before hydrant water is disposed on to the ground or storm drain. A tool box 111 may also have a workbench or workstation attached.

It is the objective of this invention to provide a power head 85, which may consist of a hydraulically driven drive motor or a DC electric motor or AC electric motor or an air driven motor or cylinder to turn a valve stem in order to open or shut the valve 92 or hydrant 94.

The power head 85 may be articulated into place over the valve by the aid of an articulating boom arm, which may be manually moved with the aid of springs or it may be powered. Adapters and extension rods 91 assist in reaching and coupling the power head 85 to the valve stem of the valve 92 or hydrant 94. A Global Positioning System 90 may be used to document and transmit the date to a computer-mapping program. Measuring devices 88 may document and transmit to a computer program the torque required to open and close a valve, the number of revolutions to open and close the valve, the flow through the valve at full open, full closed, and values in between, as well as the temperature, pressure and mechanical condition of the valve. In the case of fire hydrants 94, which are typically checked for full flow through a fire hose to atmosphere under pressure, a liquid pressure dissipater 95 (consisting of an outer shell, an open bottom, a fire hose connection and multiple baffles 99 to dissipate energy before releasing the water to the ground) is attached to the discharge of a fire hose 93, which has its supply end connected to a fire hydrant 94. This liquid pressure dissipater 95 drops the water to the ground like rain thus reducing erosion.

The above described means may be mounted on a plug in hitch 101 attachment to a vehicle hitch receiver 100 or it may be mounted on the bed of a truck, or skid mounted to be transported by a skid steer or forklift. The system may also be mounted on a trailer.

It is a further objective of the invention to access below ground utility valves, which often requires the removal of debris, gravel, or dirt before the valve stem is accessible to be opened or closed by a power head 85. With hard to turn valves the power head 85 will consist of an impact torque or pulsed torque to loosen frozen valves. Debris, gravel, or dirt 45 may be loosened by water pressure or air pressure to make it vacuum able. A vacuum container system vacuums an access to the valve stem 92. A valve box 98 can have silt vacuumed from it with a vacuum hose 17 attached to a vacuum debris tank 12, having a filter housing 62 and a vacuum producing means 11. Said vacuum producing means 11 may be generated by a compressed air venturi system or a mechanical vacuum pump blower.

| # | DEFINITION |
|---|---|
| 2- | Liquid |
| 7- | Liquid Transfer Pump |
| 8- | Container to hold liquids |
| 11- | vacuum producing means |
| 12- | Vacuum Container |
| 17- | Vacuum Conduit |
| 18- | End Door to Vacuum Container 12 |
| 31- | Mobile Platform |
| 36- | Means to Mobilize Vacuum Conduit 17 with Attachment 32 |
| 37- | Hose Reel |
| 40- | Water Jet |
| 45- | Debris |
| 58- | Jetter Hose |
| 62- | Filter Housing |
| 63- | Gooseneck Trailer Coupler |
| 64- | Skid and Lifting Receiver |
| 65- | Fill Pipe to Water Tank |
| 67- | Power Plant |
| 75- | Independent Hydraulic Drive Wheels |
| 83- | Hydraulic Power Supply |
| 84- | Hydraulic Tool and Equipment Connection |
| 85- | Hydraulic driven motor or electric driven motor |
| 86- | Articulating boom arm |
| 87- | Control system for drive motor |
| 88- | Measuring devices, Revolution and/or counter, torque for drive motor |
| 90- | GPS (Global Positioning System) to map location Of drive motor operation such as the location of a valve to be opened or closed or a core sample to be taken or a man hole location or repair point location or bored hole location. |
| 91- | Adapters for the drive motor such as extensions to Reach and connect to valve stems or augers |
| 92- | Valve with valve stem |
| 93- | Hose |
| 94- | Hydrant |
| 95- | Water pressure reducer- diffuser |
| 96- | Hose storage |
| 98- | In- ground casing to valve |
| 99- | Baffling to absorb energy and reduce water pressure |
| 100- | Hitch Receiver |
| 101- | Hitch Receiver plug in |
| 102- | Hitch Stabilizer means |
| 103- | Vehicle plug in power supply |
| 104- | Power Supply for drive motor |
| 105- | Air Compressor |
| 106- | Compressed Air Venture Vacuum Source |
| 107- | Air Reservoir |
| 108- | Air Hose |
| 109- | Air Nozzle |
| 110- | De-chlorinator |
| 111- | Tool Box with workbench top or workstation |
| 112- | Battery |

What is claimed:

1. An apparatus for accessing, opening, or closing an in ground utility valve, comprising:
a mobile platform, and having mounted on said mobile platform, a vacuum means for vacuuming dirt in order to access said utility valve, a valve actuator means for opening or closing said utility valve, a boom means comprising two or more arms for positioning said valve actuator relative to said utility valve, and an attachment means for connecting said valve actuator to a valve stem of said utility valve, whereby said vacuum means can be used for removing dirt in order to provide access to said utility valve and said boom means can be used for supporting and positioning said valve actuator relative to said utility valve, and said valve actuator can open or close said utility valve when attached to said utility valve.

2. The apparatus according to claim 1, wherein said boom means further comprises at least one power means for powering said boom wherein said power means is selected from the group consisting of a spring, an air pressure power means, a hydraulic power means, and an electric power means.

3. The apparatus according to claim 1, wherein said vacuum means further comprises a conduit means for vacuuming solids or liquids into a vacuum container.

4. The apparatus according to claim 1, further comprising a Global Positioning System means for determining a location.

5. The apparatus according to claim 1, further comprising a power means for powering said boom in order to position said valve actuator relative to said utility valve.

6. The apparatus according to claim 1, further comprises means for measuring and determining at least one condition relative to said utility valve.

7. The apparatus according to claim 1, further comprises a pump means for pressurizing water, and further comprising a water storage container placed relative to said mobile platform means.

8. The apparatus according to claim 1, further comprises at least one option selected from the group consisting of a toolbox, a workstation, a computer station, a hydraulic tool and a hydraulic tool connection means for powering at least one portable hydraulically operated tool.

9. The apparatus according to claim 1, further comprises an air compressor placed relative to said mobile platform means.

10. The apparatus according to claim 1, further comprises an engine mounted relative to said mobile platform.

11. The apparatus according to claim 1, further comprises a hose reel placed relative to said mobile platform means.

12. An apparatus for opening or closing an in ground utility valve, comprising:
a mobile platform; a vacuum means for vacuuming dirt in order to access said utility valve; a valve actuator wherein said valve actuator further comprises a drive motor means for opening or closing said utility valve; a support means for positioning said valve actuator relative to said utility valve; an attachment means for connecting said valve actuator to a valve stem of said utility valve; a controller means for controlling a rotation of said drive motor; and a Global Positioning System means for determining a location.

13. The apparatus according to claim 1 or 12, further comprising a measuring means for documenting a condition relative to said utility valve.

14. An apparatus for rotating a valve stem of an in ground utility valve, comprising:
a mobile platform; a valve actuator means for rotating a valve stem; an attachment means for connecting said valve actuator to said valve stem of said utility valve; a control means for controlling a opening or closing of said utility valve; a Global Positioning System means for determining a location; a means for documenting a rotation of said valve stem in combination with documenting a location wherein said location is determined by said Global Positioning System means; and a vacuum means for vacuuming dirt in order to access a valve stem of said utility valve.

15. The apparatus according to claim 1, 12 or 14, further comprises a recording means for documenting at least one condition relative to said utility valve.

16. An apparatus for rotating a valve stem of an in ground utility valve, comprising:
a support;
a drive motor means for rotating a valve stem of said utility valve;
a controller means for controlling characteristics relative to a rotation of said valve stem; a Global Positioning System means for determining a location with respect to an operation of said drive motor; and
a vacuum means for vacuuming dirt in order to access a valve stem of said utility valve.

17. The apparatus according to claim 1, 12, 14, or 16, wherein said mobile platform means is selected from the mobile platform group consisting of a mobile vehicle, a skid, a trailer, a truck, a skid steer, a forklift, and a zero turn radius vehicle.

18. The apparatus according to claim 1, 12, 14 or 16 further comprising a liquid pressure dissipating means for receiving water from a fire hydrant and said pressure dissipating means further comprising a conduit attachment means for receiving water, and further comprising at least one baffle means for dissipating water pressure, and further comprising an outlet means for dispensing water and further comprising measuring means for determining at least one condition relative to said fire hydrant, whereby the flow testing of one fire hydrant may be evaluated for its maintenance condition or its effect on the water utility.

19. An apparatus for opening or closing a utility valve, comprising: a mobile platform; a valve actuator which comprises a drive motor means for opening and closing said utility valve; a support means for positioning said valve actuator relative to said utility valve; an attachment means for connecting said valve actuator to a valve stem of said utility valve; a controller means for controlling a rotation of said drive motor; and a Global Positioning System means for determining a location; and a liquid pressure dissipating means for receiving water from a fire hydrant and said liquid pressure dissipating means comprising at least a baffle means for dissipating water pressure, a liquid inlet conduit attachment means for receiving water, and a liquid outlet means for dispensing water.

20. The apparatus according to claim 19 further comprises a de-chlorinator means for removing chlorine from water before said water is placed on to the ground or into a storm drain.

21. An apparatus for opening and closing an in ground utility valve, comprising: a mobile platform; a vacuum means for vacuuming dirt in order to access a valve stem of said utility valve; a valve actuator means for opening or closing said utility valve; a support means for positioning said valve actuator relative to said valve stem and a connecting means for connecting said valve actuator to said valve stem of said utility valve; a control means for controlling a opening or closing of said utility valve; a Global Positioning System means for determining a location; and a hydraulic power supply means for powering said valve actuator means and said hydraulic power supply having a hydraulic tool connection means for powering at least one portable hydraulic tool.

22. The apparatus according to claim 1, 12, 14, 16, 19 or 21, further comprises a recording means for documenting at least one condition relative to said utility valve, and further comprising a means for the documentation of at least one condition relative to said utility valve onto a computer mapping program.

* * * * *